Aug. 18, 1931.  A. A. WILSON  1,819,855
SHOCK ABSORBING MECHANISM
Filed Dec. 29, 1926  2 Sheets-Sheet 2
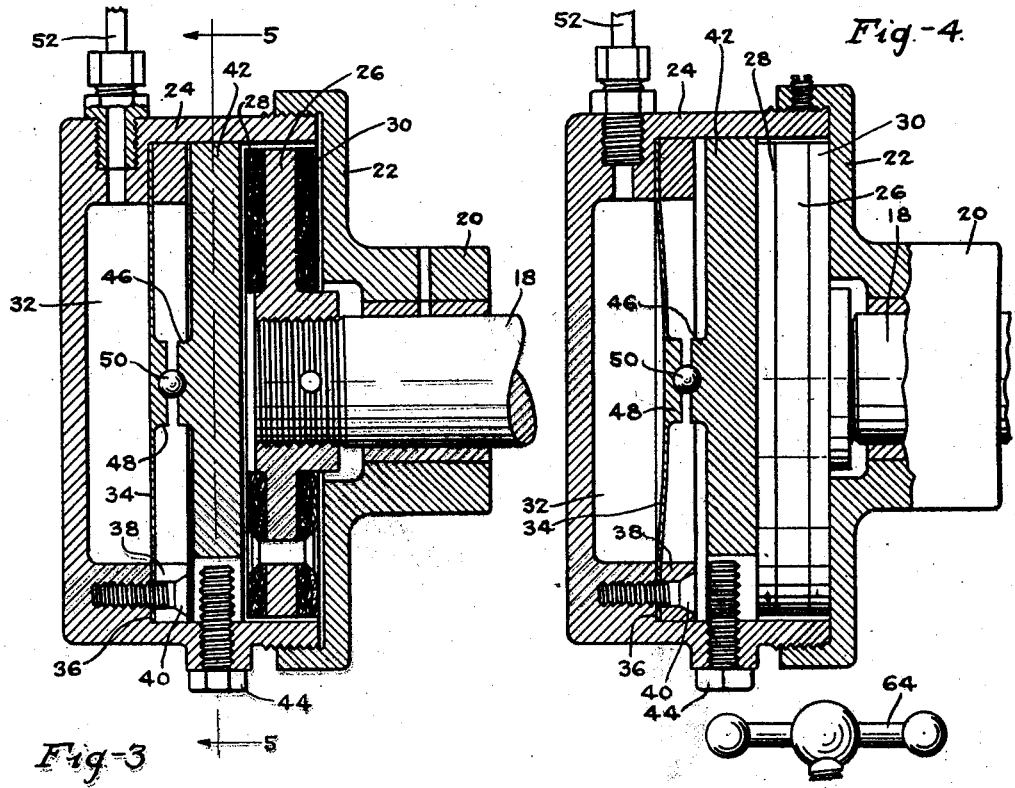
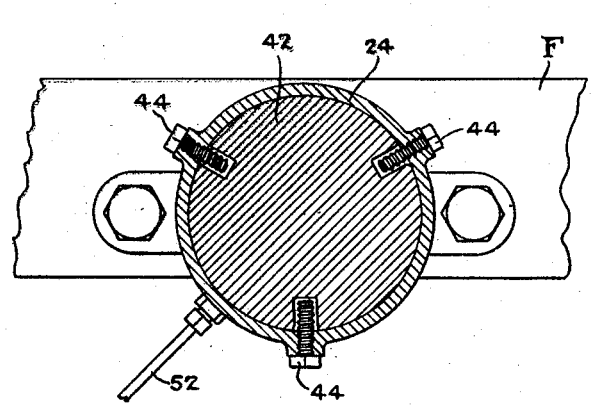
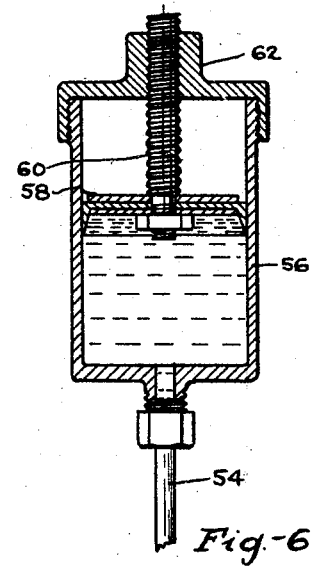
Inventor:
A. A. Wilson.
By Whiteley and Ruckman
Attorneys.

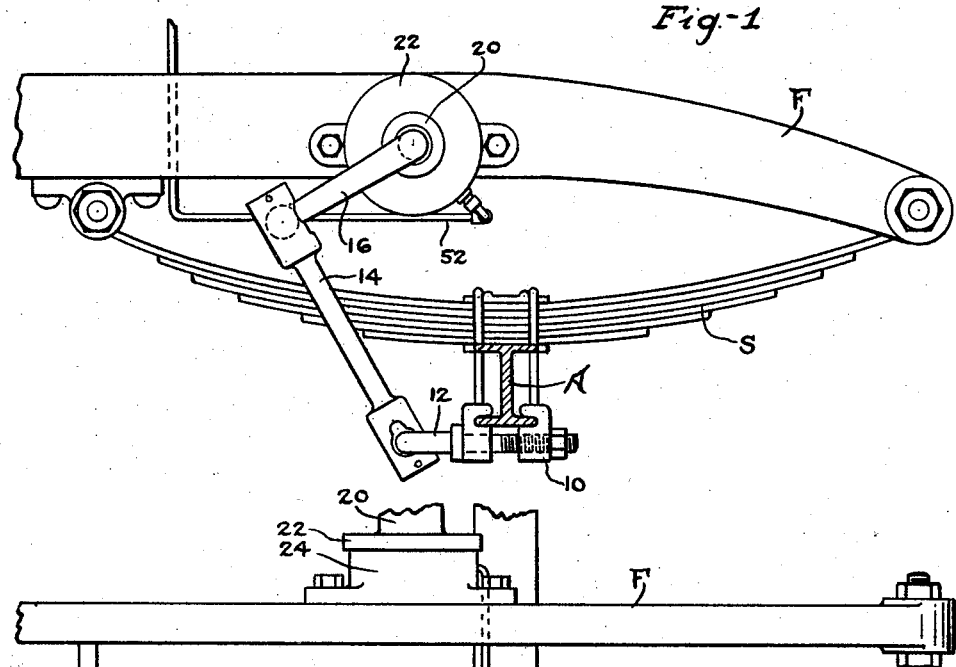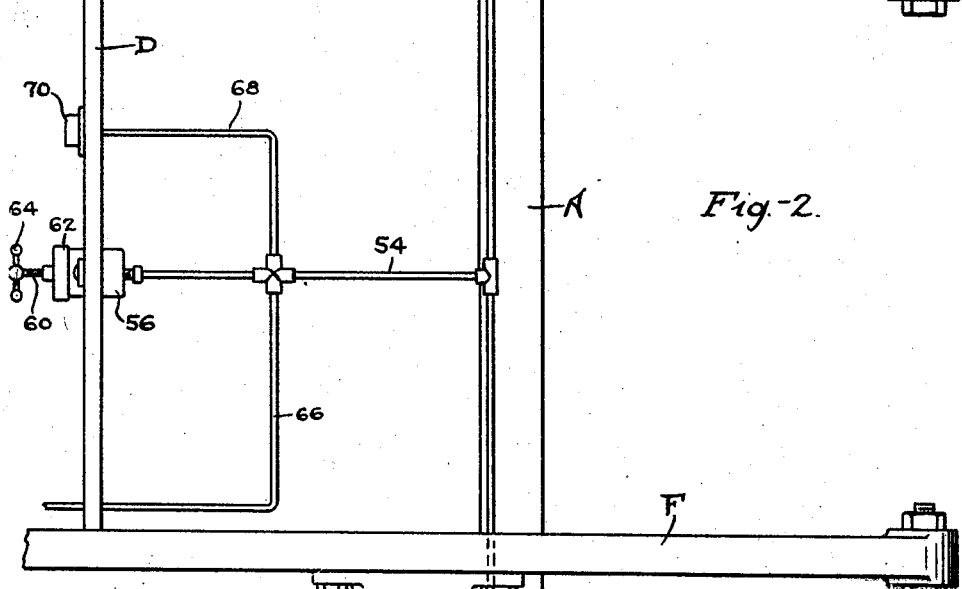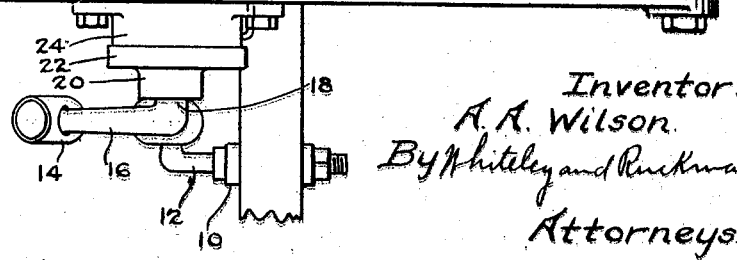

Patented Aug. 18, 1931

1,819,855

UNITED STATES PATENT OFFICE

ALBERT A. WILSON, OF MINNEAPOLIS, MINNESOTA, ASSIGNOR OF ONE-HALF TO
ALEXANDER D. ROBERTSON

SHOCK ABSORBING MECHANISM

Application filed December 29, 1926. Serial No. 157,698.

My invention relates to shock absorbing mechanism, and an object is to provide an efficient mechanism of this character for use with automobiles and similar vehicles. It is well known that when automobiles which are being driven along a roadway strike bumps and depressions, the upward movement of the vehicle springs unless restrained causes a rebound which is unpleasant for the occupants of the automobiles, and also sometimes causes breakage of the springs. Before the time of my invention, in order to prevent the rebound, it has been customary to employ shock absorbers of the friction type having two relatively movable members held together in frictional engagement but so far as I am aware, it is broadly new to hold the relatively movable friction members in engagement by pressure exerted by a fluid medium. Special objects of my invention are to provide mechanism which operates to produce a shock absorbing action in connection with all four wheels from a common source of supply of fluid in the manner just stated, and to provide means by which the pressure of the fluid can be controlled by the driver as desired, and also to provide means for indicating the pressure of the fluid.

The full objects and advantages of my invention will appear in connection with the detailed description thereof, and the novel features of my inventive idea will be particularly pointed out in the claims.

In the accompanying drawings which illustrate one form in which my invention may be embodied,—

Fig. 1 is a fragmentary side elevational view of an automobile frame with my shock absorber applied. Fig. 2 is a top plan view of the same. Fig. 3 is a view in section through one of the frictional devices in released condition. Fig. 4 is a similar view but with the frictional devices shown in tensioned condition and partly in elevation. Fig. 5 is a view in section on the line 5—5 of Fig. 3. Fig. 6 is a sectional view of a pressure controlling device.

The automobile may be of any standard construction, that shown in the drawings including frame members F to which are attached springs S secured to axles A. It will be understood that similar springs are used at the ends of both front and rear axles and that similar restraining means are provided for each of the springs. A clamp 10 secured to the axle carries a rod 12 to the free end of which the lower end of a link 14 is pivotally attached as by means of a ball and socket connection. The upper end of the link 14 is pivotally attached as by a ball and socket connection to a crank arm 16 formed on the outer end of a shaft 18 rotatably mounted in a bearing 20 carried by a head 22 which is secured to one end of a short cylinder 24 fastened to the frame member F above the spring S. An annular member 26 is secured to the end of the shaft 18 within the cylinder 24 while washers 28 and 30 of fibrous material such as raybestus are secured to the two opposite faces of the member 26. The closed end of the cylinder 24 has a chamber 32, the inner side of which is constituted by a flexible diaphragm 34 whose periphery is secured to a shoulder 36 by a ring 38 through which screws 40 are threaded. The washer 30 is adapted to frictionally engage the head 22 while the washer 28 is adapted to frictionally engage a disk 42, the periphery of which is provided with notches for receiving screws 44 threaded through the wall of the cylinder so that the disk 42 is held from rotation and permitted to have a slight sliding movement. When the diaphragm is bulged inwardly as shown in Fig. 4, it applies pressure to the disk 42. In order that this pressure may be advantageously applied, projections 46 and 48 may be secured to the centers of the disk and diaphragm respectively, these projections being slightly separated from each other by a ball 50 which fits into recesses in the two projections. A pipe 52 is tapped through the wall of the chamber 32 and as shown in Fig. 2, this pipe connects the chambers of the two front cylinders. The pipe 52 is connected by a pipe 54 with a container 56 secured to the dash or instrument board D of the automobile. The container 56 is provided with a plunger 58 having a screwthreaded plunger rod 60 extending through a threaded opening in a cap 62 with which the container is provided. The outer end of the rod 60 carries a cross rod or handle 64 by which the rod 60 may be turned by the driver to move the plunger. A pipe 66 extends from the pipe 54 to the rear of the automobile for operating restraining means like that already described in connection with the rear springs. A pipe 68 leads from the pipe 54 to a pressure indicator 70 placed within sight of the driver as for example by being placed on the instrument board.

The operation and advantages of my invention will now be readily understood. It will be understood that the pipe system including the container 56 and the chamber 32 is filled with a fluid and while various fluids will cause the apparatus to operate under certain conditions, I prefer to employ a liquid having a low freezing point such as oil, glycerine, and alcohol solution. It will also be understood that a liquid is more responsive to applied pressure than is the case with a gas such as air. The apparatus may be readily installed in automobiles already in use or may be provided as part of the standard equipment when the automobiles are built. When the plunger 58 is in its uppermost position, no pressure will be exerted on the diaphragm 34 which will, therefore, occupy the position shown in Fig. 3 with the fiber washers out of frictional engagement with the fixed opposed surfaces so that the shaft 18 may rotate freely with no restraining action exerted on the vehicle springs. Upon turning the handle 64 in the proper direction, the plunger will be moved downwardly and pressure will be transmitted through the fluid to the diaphragm 34 causing it to bulge inwardly as shown in Fig. 4 and causing the disk 42 and also the annular member 26 secured to the shaft 18 to move sufficiently to bring the washers 28 and 30 into frictional engagement with the disk 42 and the head 22 respectively. The pivotal connection of the crank arm 16 with the link 14 is such that it is not interfered with by the slight sliding movement of the shaft 18. The amount of restraining action produced by the frictional engagement may be easily varied as desired or even completely relieved by turning the handle 64 in the proper direction while the degree of pressure corresponding to the desired restraining action may be readily observed on the indicator. The shock absorbing effect is equalized for all four wheels of the vehicle since the pressure is applied uniformly and simultaneously. It is obvious that if the pressure holding the frictional members in engagement decreases on account of wear of the parts, this will be indicated on the gauge, and the driver may easily bring the pressure back to the desired amount by a slight turn of the handle 64.

I claim:—

1. A shock absorbing mechanism for vehicles comprising a rod held by an axle of the vehicle, a link pivotally attached at one end to said rod, a cylinder mounted on the frame of the vehicle, a shaft axially disposed with relation to said cylinder and projecting from one end thereof, a crank on the projecting end of said shaft pivotally connected to the other end of said link, the inner end of said shaft extending part way only through said cylinder, a disk member secured to said inner end, a disk member slidably and non-rotatably mounted in said cylinder adjacent said first disk member, a flexible diaphragm spaced from the other end of said cylinder whereby a compartment is formed therein, said diaphragm being disposed adjacent said slidable disk member for applying pressure thereto, a source of fluid supply connected to said compartment, and pressure applying means within reach of the driver whereby pressure may be transmitted through said fluid to flex said diaphragm.

2. A shock absorbing mechanism for vehicles comprising a rod held by an axle of the vehicle, a link pivotally attached at one end to said rod, a cylinder mounted on the frame of the vehicle, a shaft axially disposed with relation to said cylinder and projecting from one end thereof, a crank shaft on the projecting end of said shaft pivotally connected to the other end of said link, the inner end of said shaft extending part way only through said cylinder, a disk member secured to said inner end, a disk member slidably and non-rotatably mounted in said cylinder adjacent said first disk member, washers of fibrous material interposed between said disk members and between said first disk member and the head of said cylinder, a flexible diaphragm spaced from the other end of said cylinder whereby a compartment is formed therein, said diaphragm being disposed adjacent said slidable disk member for applying pressure thereto, a source of fluid supply connected to said compartment, and pressure applying means within reach of the driver whereby pressure may be transmitted through said fluid to flex said diaphragm.

3. A shock absorbing mechanism for vehicles comprising a rod held by an axle of the vehicle, a link pivotally attached at one end to said rod, a cylinder mounted on the frame of the vehicle, a shaft axially disposed with relation to said cylinder and projecting from one end thereof, a crank on the projecting end of said shaft pivotally connected to the other end of said link, the inner end of said shaft extending part way only through said cylinder, a disk member secured to said inner end, a disk member slidably and non-rotatably mounted in said cylinder adjacent said first disk member, a flexible diaphragm spaced from the other end of said cylinder whereby a compartment is formed therein, central projections on said diaphragm and said slidable disk member respectively extending toward each other, said projections containing recesses, a ball fitting into said recesses, a source of fluid supply connected to said compartment, and pressure applying means within reach of the driver whereby pressure may be transmitted through said fluid to flex said diaphragm.

In testimony whereof I hereunto affix my signature.

ALBERT A. WILSON.